United States Patent [19]
Hopkins et al.

[11] Patent Number: 4,948,249
[45] Date of Patent: Aug. 14, 1990

[54] HEADLIGHT AIMING AND LIGHT PATTERN TESTING APPARATUS AND METHOD

[75] Inventors: Ross E. Hopkins, Emporia; John J. Humbard, Pittsburg, both of Kans.

[73] Assignee: Hopkins Manufacturing Corporation, Emporia, Kans.

[21] Appl. No.: 65,573

[22] Filed: Jun. 23, 1987

[51] Int. Cl.$^5$ .............................................. G01J 1/00
[52] U.S. Cl. .................................................... 356/121
[58] Field of Search ......................................... 356/121

[56] References Cited

U.S. PATENT DOCUMENTS

| | | | |
|---|---|---|---|
| 2,162,010 | 6/1939 | Graham | 356/121 |
| 3,515,483 | 6/1970 | Irwin | 356/121 |
| 3,532,432 | 10/1970 | Mansour | 356/121 |
| 4,120,589 | 10/1978 | Mima et al. | 356/121 |
| 4,435,078 | 3/1984 | de Brabander et al. | 356/121 |
| 4,647,195 | 3/1987 | Ishikawa et al. | 356/121 |
| 4,679,935 | 7/1987 | Fukuda et al. | 356/121 |

FOREIGN PATENT DOCUMENTS

| | | | |
|---|---|---|---|
| 59125 | 4/1982 | Japan | 356/121 |
| 116235 | 7/1982 | Japan | 356/121 |

OTHER PUBLICATIONS

*Design Line* published by Baugh Design, Inc., Wichita, Kansas, (Summer–Fall 1986).

*Primary Examiner*—Richard A. Rosenberger
*Attorney, Agent, or Firm*—Calfee, Halter & Griswold

[57] ABSTRACT

An apparatus and method for aiming vehicle headlights and for visually displaying the illumination patterns of vehicle headlights. The apparatus focuses the light beam on a screen and includes a video sensor for sensing the intensity of the light in each cell of a matrix of cells overlying the focused light beam and for generating an electrical signal for each cell indicative of the position of the cell and the intensity of the light beam in each cell and a computer for comparing at least some of the electrical signals to each other and with established criteria to determine whether the headlight is aimed within a prescribed degree of accuracy. The same apparatus may be used to describe the illumination pattern of a headlight by visually displaying at least some of the electrical signals, i.e. the light intensities and their locations, for example on a printer or CRT. The conformance of headlight aiming and illumination to established standards can be easily determined by including steps in the computer software to apply the applicable criteria. The aiming conformance tests may produce error signals for controlling powered screwdrivers to correct errors in aiming. The apparatus preferably includes a centering indicator for centering the headlight relative to the lens by comparing electrical signals produced by discrete light intensity sensors disposed around the periphery of the lens.

3 Claims, 5 Drawing Sheets

HEADLIGHT AIMING AND LIGHT PATTERN TESTING APPARATUS AND METHOD

This invention relates to apparatus and methods for accurately aiming vehicle headlights in the course of vehicle manufacture or after the vehicle has been in use. In addition, in the invention, the pattern of light emitted by a vehicle headlight can be measured and compared against established criteria to determine if the lamp meets prescribed standards.

BACKGROUND

Vehicular headlights are designed to project high intensity beams of light in prescribed patterns over selected portions of a highway. Generally, vehicles are equipped with a pair of headlights for projecting so-called high beams of light to illuminate the entire width of the highway in front of the vehicle. A second pair of headlights projects a so-called low beam pattern that is directed downwardly and to the right of the high beam so as not to blind an oncoming motorist. In some vehicles, high and low beam patterns are projected from the same lamps using different filaments.

In order to produce the desired illumination, headlight lamps must be properly aimed and produce a particular light pattern. Standards for headlight aiming and illumination patterns are prescribed by industrial groups, such as the Society of Automotive Engineers (SAE), and by governmental agencies. Generally, different aiming and illumination pattern standards have been prescribed for different geographical areas, such as North America and Europe, making it difficult to produce a universally applicable aiming apparatus.

Devices and methods for determining proper vehicle headlight aiming during vehicle manufacture and after vehicles have been in use are known. Two examples of known methods and apparatus are described in U.S. Pat. Nos. 3,515,483 to Irwin and 4,435,078 to de Brabander et al. These known devices employ a lens to focus a headlight light beam within a compact electro-optical unit. A number of discrete light intensity sensors are disposed within the optical system for sensing the intensity of light at a relatively small number of positions in the light beam. In the '483 patent, the intensities of light detected by each of nine discrete light intensity sensors are compared in selected pairs to determine whether established aiming criteria are satisfied within a prescribed degree of accuracy. If not, the position of the headlight is adjusted to achieve the proper aim. This method of comparing the relative intensities of different portions of the light pattern is referred to as the fractional balance method. The '078 patent employs a variation of the fractional balance aiming technique. There, light intensities measured at about the same number of discrete points by discrete light intensity sensors are used directly, or after being multiplied by fractional constants, in various comparison tests to determine whether a headlight is accurately aimed or not.

While the known methods and devices are useful in accurately aiming vehicular headlights, the devices are specifically designed for use with a particular set of aiming standards. That is, the known methods and devices are limited in flexibility. The known devices are not readily adaptable to different or changing aiming standards because they sense light intensities at a limited number of discrete locations in the headlight beam based on a particular standard. In addition, the known apparatus and methods are inadequate to assure that the light pattern emitted by a headlight meets industry and governmental standards. In an era of increasingly stringent governmental standards concerning headlight aiming and beam patterns, particularly for newly manufactured vehicles, it is important that a headlight aiming device provide accurate and rapid results, be adaptable to new standards and be capable of testing a headlight beam pattern in addition to aiming accuracy.

Accordingly, it is an object of the present invention to provide a vehicle headlight aiming method and device that is readily adaptable to different aiming standards.

Another object of the invention is the provision of a headlight aiming method and device that is not limited in performance by the specific locations of a limited number of discrete light intensity sensors.

Still another object of the invention is the provision of apparatus and methods for readily measuring headlight illumination pattern.

Yet another object of the invention is the provision of apparatus and methods for measuring both headlight aim accuracy and headlight illumination pattern.

A further object of the invention is the provision of an automatic headlight aiming method and device in which errors in headlight aiming can be rapidly and automatically corrected.

Another object of the invention is the production of a visual display of the illumination pattern of a headlight.

SUMMARY OF THE INVENTION

The objects of the invention are achieved in an apparatus in which the light beam of a headlight is focused on a surface or screen and including a video sensor for sensing the light intensity in each cell of a continuous matrix of cells that overlies the focused light beam. The video sensor produces an electrical signal, either in digital or analog form, for each cell. The signal indicates the cell location and the light intensity in that cell. Analog signals, such as are produced by a charge coupled device, are preferably digitized. The digital signals, i.e. pixels, may be manipulated by a computer to determine headlight aiming accuracy, to correct inaccurate aiming and to describe the illumination pattern of a headlight.

The computer is preferably a microprocessor programmed with software for applying recognized industrial or govermental standards to tests of headlight aiming and illumination pattern. Different or changed standards can readily be accommodated by changing only software without any mechanical change in the apparatus. Measurements of headlight aiming accuracy can be used to produce error signals indicative of the amount and direction of aiming error. The error signals may be used to actuate powered screwdrivers to correct headlight aim.

Preferably the apparatus includes a number of discrete light intensity sensors for centering a headlight relative to a lens or focusing aperture. The discrete sensors are uniformly disposed around the periphery of the lens or aperture and detect light from the headlight. Preferably four such sensors are employed and the strengths of the signals generated by opposed pairs of the sensors are compared. When the sensors in each pair of sensors generate substantially equal strength signals, the desired centering is achieved.

In the aiming and illumination pattern methods, tests such as those specified by the SAE are applied in a novel way. Low beam tests search the matrix of pixels to locate two cells having prescribed light intensity and geometric relationships. Orthogonal axes are drawn through the two points, when located. The location of the intersection of the axes is compared to a mechanical axis specified by the vehicle manufacturer to determine accuracy of the aim. High beams are tested by separately balancing light intensities on opposite sides of a pair of orthogonal axes. Each axis is located to achieve the best balance of total light intensities on opposite sides of the axis. The intersection of these axes is calculated and compared to a vehicle-specific mechanical axis to determine aim accuracy.

By displaying at least some of the pixels, i.e. light intensity versus location, the illumination pattern can be visually described. The pattern may be described by a tubular or graphical display on a printer or CRT. Isocandela contours may be easily plotted to illustrate the pattern.

DETAILED DESCRIPTION

Figure 1:
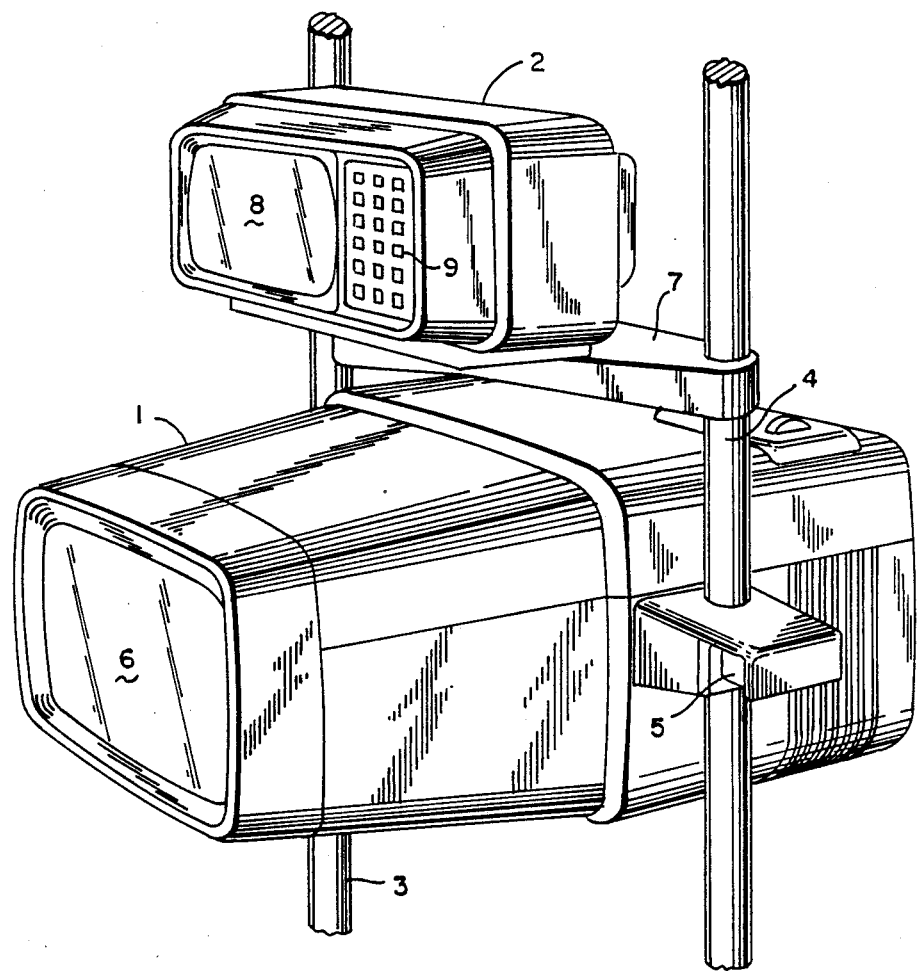
FIG. 1 is a perspective view of an apparatus according to the invention.

In FIG. 1 a perspective, external view of one embodiment of the invention is shown. That embodiment includes two housings 1 and 2, commonly mounted on a support including two generally vertical posts 3 and 4. Posts 3 an 4 extend upwardly from a base (not shown). The base can move transverse to the orientation of posts 3 and 4 on a track, such as is shown in U.S. Pat. No. 3,515,483. That patent is incorporated herein by reference. The base also includes means fo adjusting the attitude of housing 1. Angular compensation may be necessary to eliminate the effects of any deviation from a true horizontal position of a floor supporting a vehicle containing headlights to be aimed. Angular errors in the floor can produce errors in the aiming if not taken into account.

Housing 1 can be adjusted vertically on posts 3 and 4 by means of a pair of releasable latches, of which only latch 5 is visible in FIG. 1. At its front end, housing 1 includes a lens 6 for focusing within housing 1 a light beam of a vehicular headlight, as further explained below. Lens 6 is positioned opposite a vehicular headlight by raising or lowering housing 1 as necessary and moving its base. Housing 1 includes other optical and electronic components as explained in connection with FIG. 2. Like elements in all of the figures are given similar reference numerals with the understanding that the drawing figures are merely illustrative of some embodiments of the invention.

Housing 2 is supported on a bracket 7 that rotates about post 4 and that may be moved along post 4 to a convenient viewing height. Housing 2 includes a CRT display 8 for displaying instructions, results, error messages, etc. Adjacent CRT 8 in housing 2, a keyboard 9 permits an operator to control the functioning of the apparatus, so that headlights can be appropriately aimed and illumination patterns displayed. As explained below, some embodiments of the invention include the ability to display headlight illumination patterns on CRT 8 and/or on a printer (not shown). A computer that controls the functioning of the components mounted in housing 1 and housing 2 is also mounted in housing 2. Housing 1 and housing 2 are connected by a multiple conductor electrical cable not visible in FIG. 1.

Figure 2:
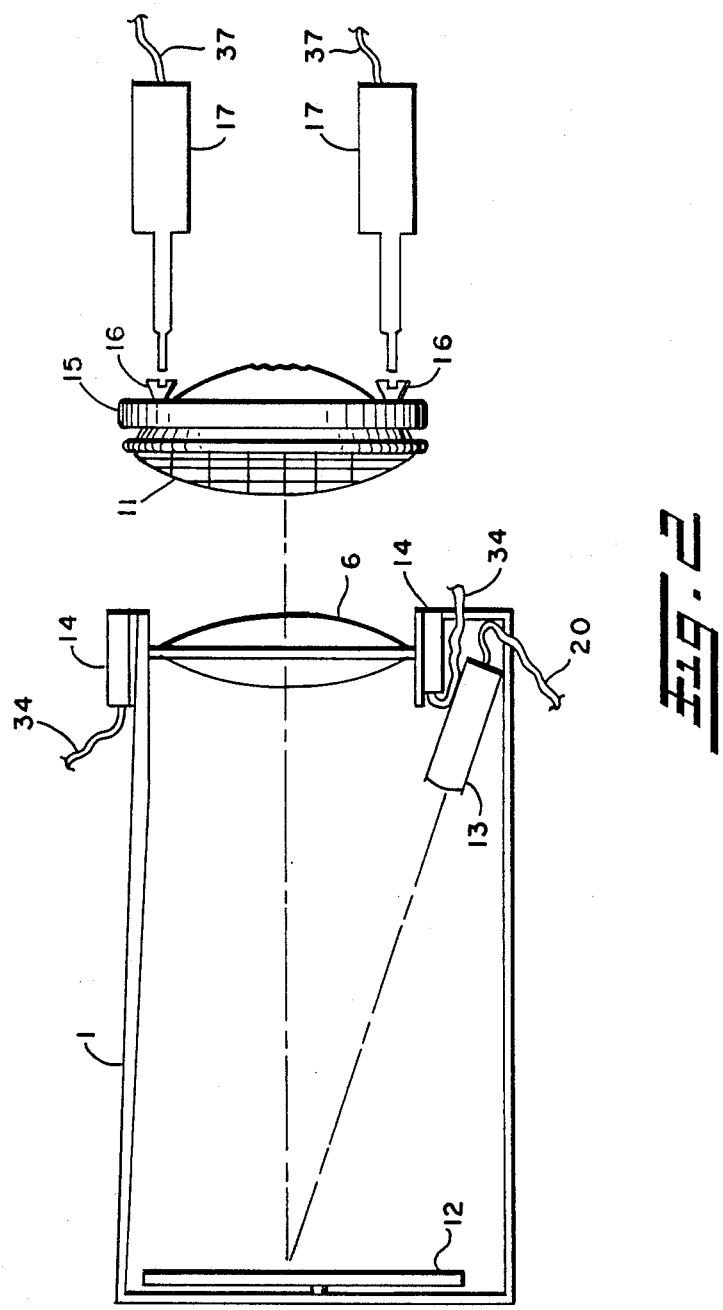
FIG. 2 is a side view, partially in section, of a portion of an apparatus according to the invention.
Figure 3:
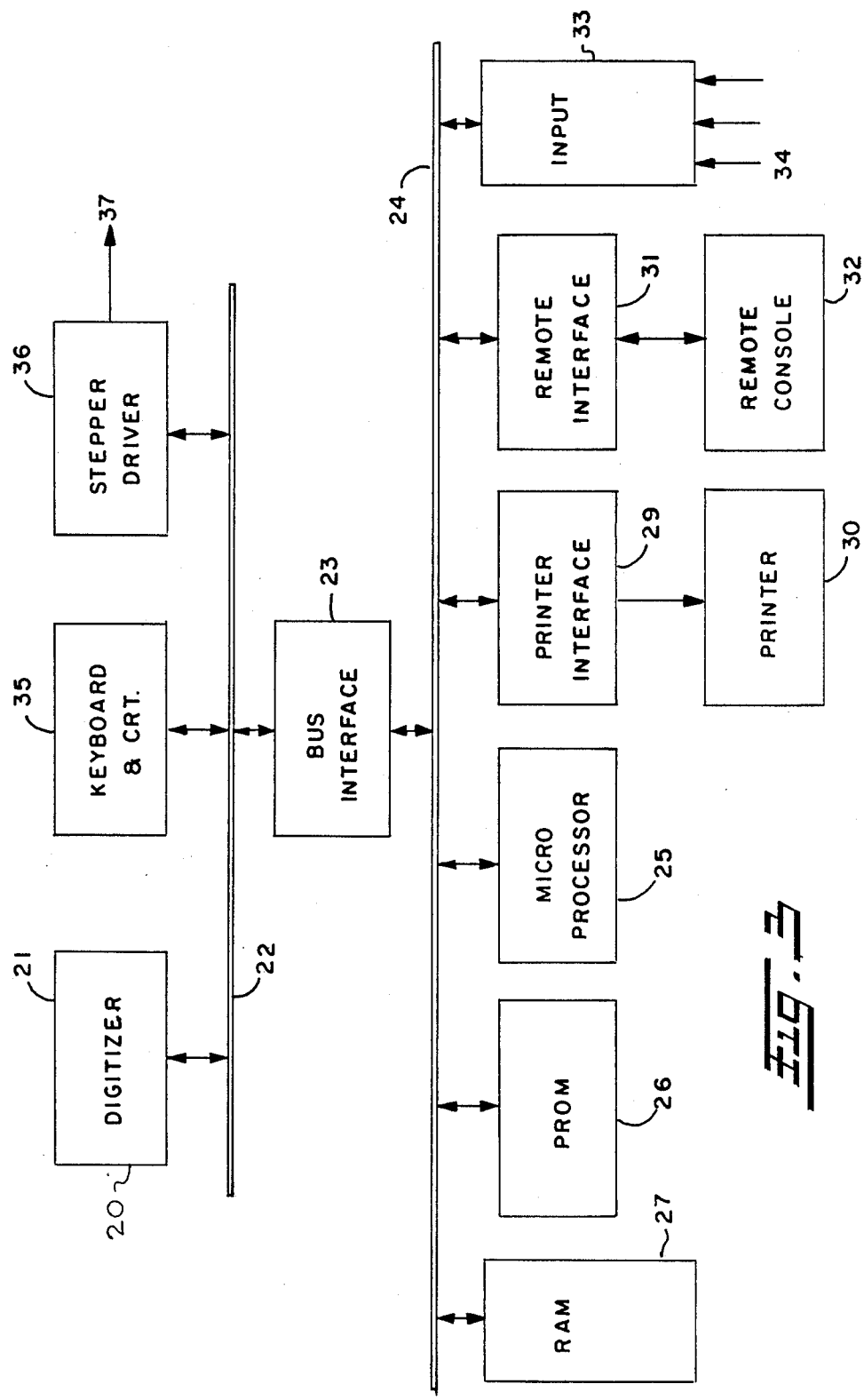
FIG. 3 is a schematic, block diagram of a portion of an apparatus according to the invention.
Figure 4:
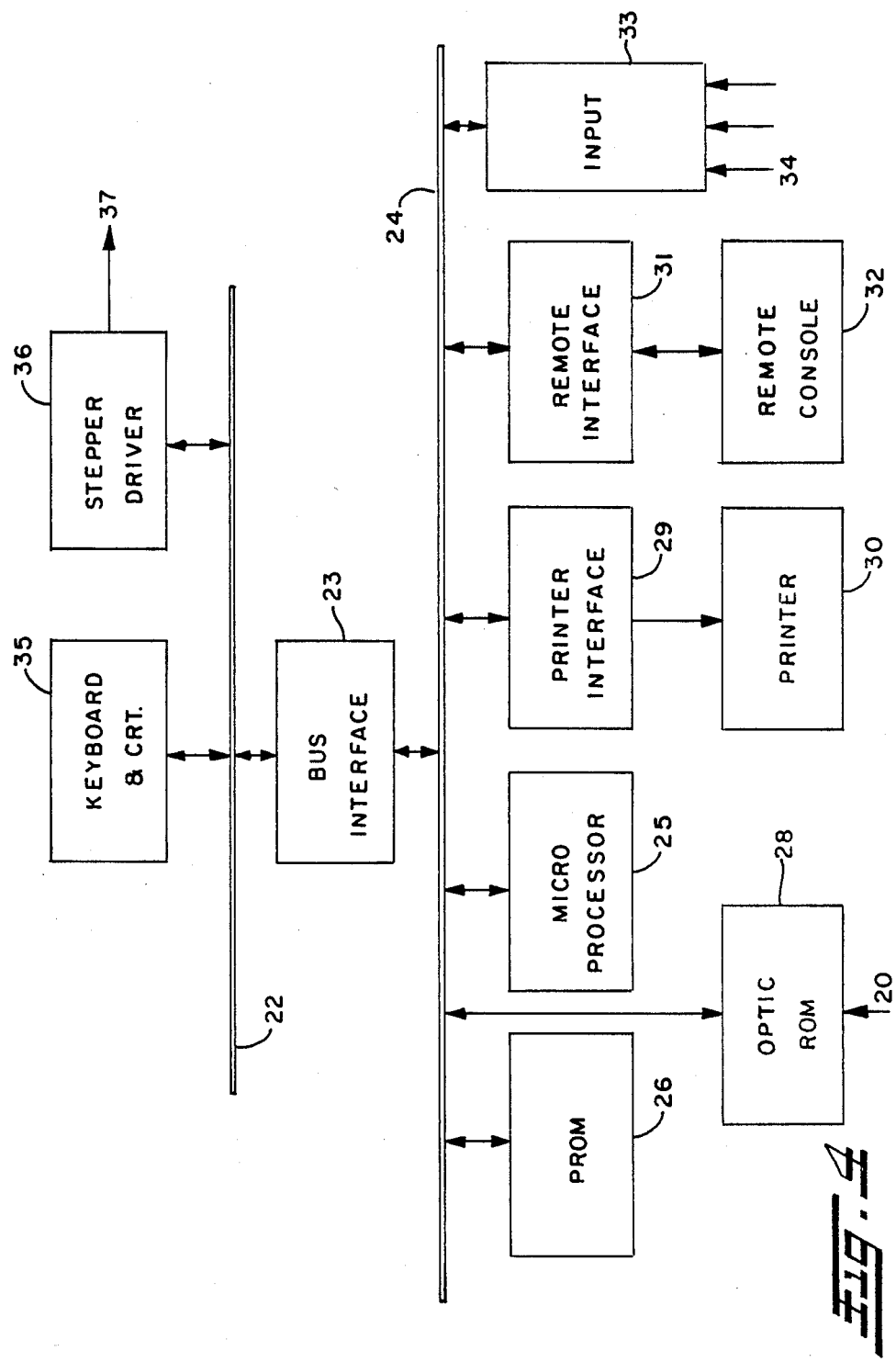
FIG. 4 is a schematic, block diagram of a portion of an apparatus according to the invention.

The components within housings 1 and 2 and their interaction with each other can be better understood by reference to FIGS. 2,3 and 4.

FIG. 2 is a schematic, sectional side view of the components of an embodiment of the invention. In FIG. 2, housing 1 has an open end in which lens 6 is mounted. Lens 6 is a converging lens that focuses a beam of light from a vehicular headlight 11 onto a surface or screen 12 mounted within housing 1 opposite lens 6. Lens 6 is shown as a double convex converging lens, although a Fresnel lens can also be used in the apparatus. Lens 6 is relatively large so that it may capture nearly all of the light from lamp 11. Preferably lens 6 is larger in area than lamp 11 and may be made of glass or a plastic.

SAE headlight aiming and headlight pattern tests specify test conditions in which the lamp beam is imaged on a surface spaced 25 feet from the lens. Such a distant focusing surface requires an inordinate amount of space both in vehicle assembly operations and in vehicle service facilities. The focal length of lens 6 is chosen so that an image comparable to that would be formed 25 feet from headlight 11 is formed in a smaller size on screen 12. However, lens 6 and screen 12 are separated by a relatively short distance, for example only a few feet, so that considerable space is saved. Because of compression of the image size and the sensing of its intensity at many cells within the image as described below, it is important that lens 6 introduce little distortion into the light beam.

The image formed on screen 12 is sensed by a video sensor 13 that is disposed within housing 1. Video sensor 13 includes a relatively large number of light intensity sensors arranged in a matrix. The matrix of sensors permits the intensity of the light beam to be measured in each of a large number of substantially continuous well defined cells. For example, video sensor 13 could be a charge coupled device (CCD), camera such as commercially available from Fairchild Camera & Instrument Company of Mountain View, Calif. A typical, commercially available CCD camera includes a catrix of over 185,000 light intensity sensors. In CCD devices, each sensors responds to the intensity of light falling on it. The matrix of sensors is interrogated, electronically, and the light intensity information is read out of the CCD array in analog format in a predetermined sequence across the rows and columns of the matrix. That is, by knowing the position of a light intensity value in the read-out sequence, the location at which that light intensity was measured can be determined.

As an alternative video sensor, an integraed light intensity sensor matrix, digitizer and memory may be employed in conjunction with a pinhole camera. An example of such a device is an IS32 unit available from Micron Technology of Boise, Id. The IS32 unit resembles a 64K read only memory (ROM) in which each memory element is exposed to light. Each memory element electrically discharges an initial electrical charge in proportion to the amount of light falling on it. The unit therefore measures light intensity at each cell, and that stores intensity data directly in the cell. The ROM can be interrogated in a random fashion and can provide light intensity values and cell location data directly in a digital format.

As is apparent from FIG. 2, it is important to center headlight 11 relative to lens 6, or a focusing aperture if no lens is used, to form the proper image for headlight aiming and illumination pattern measurements. Proper alignment may be achieved with the aid of a number of discrete light intensity sensors 14 disposed substantially uniformly around the periphery of lens 6 or focusing aperture. Two such sensors 14 are shown in FIG. 2. Three light intensity sensors may be used for centering. However, it is preferred that four discrete light intensity sensors spaced 90° apart around the focusing element 6 be employed in the centering function. Each of sensors 14 receives some of the light emitted by lamp 11. The relative positions of the lamp and focusing element (lens or aperture) may be adjusted so that the relative amounts of light captured by each sensor 14, as indicated by its electrical response, are balanced according to a centering standard. In many vehicular headlights, the emitted light beam is not axially symmetrical. Therefore, it is preferred to use four light sensors 14 and to adjust the relative positions of the focusing element and lamp 11 so that two, generally vertically disposed light sensors 14 produce substantially identical output signals and two generally horizontally disposed light sensors 14(not visible in FIG. 2), produce substantially identical electrical outputs. Light sensors 14 can be photovoltaic cells that generate an electrical signal in response to incident light intensity or they may be photoconductors having resistances that change in response to light intensity. The described centering function can be part of the automated control for the invention that is described below.

In FIG. 2 lamp 11 is shown schematically and adjustably mounted in a frame 15. The position of lamp 11 within frame 15 is controlled by the positions of adjusting screws 16. While only two adjusting screws are shown, a headlight mounting may have three or more adjusting screws. In one embodiment of the invention, powered screwdrivers 17 include blades for engaging screws 16. Screwdrivers 17 include stepping motors that may be controlled with pulsed electrical signals so that the screwdriver blades turn adjusting screws 16 by a predetermined amount to correct the aim of lamp ll. That is, to correct the aimi of headlight 11 in a particular direction and by a particular amount, an appropriate electrical signal is supplied to screwdrivers 17 which turn screws 16 in the proper direction and by the proper amount to effect the desired aiming correction.

In FIG. 3, one embodiment of electronic controls for the headlight aiming apparatus and method is schematically shown. Input and output information and control signal interconnections are indicated with identical reference numbers in FIGS. 2 and 3. For example, data on light intensity and position from video sensor 13 is passed along line 20 to the circuitry of FIG. 3. When video sensor 13 is a CCD camera or similar analog signal device, its output signals are supplied over line 20 to a digitizer 21. The digitizer quantizes each light intensity measurements and converts it into a digital word. The portion of the word length dedicated to light intensity information determines the number of light intensity levels that may be distinguished in the apparatus. For example, six bits permits quantizing the light intensities into sixty-four different levels.

At the same time the digital light intensity value for a particular location is determined and digitized, information on the position at which that light intensity is measured is also obtained from video sensor 13. Preferably, the light intensity level is identified by row and column numbers relative to an origin in the matrix of light intensity sensors in the video sensor 13. These row and column numbers also correspond to cells in the matrix that overlies the focused light beam image. For a CCD camera, the location data may be derived from the position of the light intensity value in the interrogation sequence.

The digital information from digitizer 21 is passed along a data bus 22 to a bus interface 23 for communication to the microcomputer employed in the invention to determine aim and light radiation pattern. Bus interface 23 receives and transmits information via a second data bus 24 over which a number of components communicate with each other. Those components are under the control of a micorprocessor 25 which executes a computer program stored in a programmable read only memory (PROM) 26. Microprocessor 25 and PROM 26 are in direct communication through data bus 24. Also in communication with data bus 24 is a random access memory (RAM) 27 for storing data matrices representing sensed light intensities at the cells in the matrix and their locations.

In a preferred embodiment of the apparatus, a data matrix containing 61,440 data elements of light intensity and relative location are stored in RAM 27. This number of data elements corresponds to a matrix containing 256 columns and 240 rows. If video sensor 13 contains a larger number of light sensors than the desired number of cells, the desired number of cells can be obtained by ignoring the measurements of certain light sensors or by averaging the measurements of adjacent light sensors to achieve the desired number of data elements. In addition, some of the peripheral light intensity sensors in the video sensor may not contain useful light intensity information and might be ignored. In this preferred embodiment, RAM 27 may have 128K of memory. Likewise, 128K of memory for PROM 26 has proven sufficient for storing the software for operating the novel aiming and light pattern device.

A printer interface 29 in communication with data bus 24 is employed to drive a printer 30 for displaying visual output data. The visual output data may be alphanumeric print-outs as in Tables I and II below, or can be graphical outputs as in FIGS. 4 and 5 below. A remote control interface 31 in communication with data bus 24 drives a remote console 32 so that the aiming device may be controlled at a location remote from the testing location. Preferably, remote interface 31 is a conventional RS232 port. Remote control and monitroing of the apparatus can be particularly useful in vehicle assembly plants. In servicing existing vehicles, an integrated unit like that of FIG. 1 is preferred so that interface 31 and console 32 are likely to be absent. In a simple unit, for servicing use, printer interface 29 and printer 30 are also likely to be omitted with CRT and keyboard providing the sole input and output means.

An input interface 33 in communication with data bus 24 allows various analog inputs to be supplied to the computer. For example, the analog signals 34 from centering light sensors 14 may be supplied to input interface 33 if the software provides for interactive centering of the apparatus with respect to headlight 11. Bus interface 23 also controls the input and output of information from a keyboard and CRT 35 shown in FIG. 1 as mounted within housing 1. Preferably keyboard and CRT 35 are interactive so that a human operator can initiate operation of the apparatus and generally control its functions.

As explained below, under control of the program resident in PROM 26, the apparatus can produce an electrical error signal indicating the amount and direction by which a headlight is incorrectly aimed. This error signal can be supplied by interface 23 through bus 22 to a stepper driver 36 for generating pulse trains to operate powered screwdrivers 17. These pulsed signals direct which, if any, of the screwdrivers should be engaged with screws 16, what direction the screws should be turned and the amount that they should be turned. This aiming correction information is supplied over lines 37. Automatic aiming is particularly useful in vehicle production, but is unlikely to be included in vehicle maintenance servicing.

In FIG. 4 an alternative embodiment of the circuitry of FIG. 3 is schematically shown. The circuitry of FIG. 4 is intended to be used with a video sensor, like the IS32, that directly produces digital signals indicative of light intensity in each cell and cell location and that stores a data matrix of light intensity and location data. In this embodiment video sensor 13 is indicated as optic ROM 28. Optic ROM 28 is in direct communication with bus 24. In this embodiment, digitizer 21 and RAM 27 are unnecessary and are absent. Since optic ROM 28 digitally records the light intensity data and retains it in an addressable matrix memory, location-specific light intensity data can be retrieved directly from optic ROM 28 as needed. Therefore digitizer 21 and RAM 27 are, in this embodiment, superfluous. Additionally in this second embodiment, since optic ROM 28 is also the video sensor, it is physically located in housing 1.

The operation of the apparatus and the novel method are best illustrated by specific examples. In the described examples, a CCD camera is employed as video sensor 13 and SAE standards are used as a reference for determining aiming accuracy and desired beam pattern. The particular software stored in PROM 26 controls the particular test standard applied. By modification of the computer program, different standards, such as subsequent modifications to SAE standards, European standars or newly promulgated government standards, can be incorporated into the operation of the apparatus without any mechanical change. The store program can be easily changed, for example by removing PROM 26 and substituting for it a replacement PROM containing revised software. Most preferably, PROM 26 is an erasable PROM, so that it can be directly reprogrammmed with appropriate equipment.

Preferably, when the equipment is reset or first energized, microprocessor 25 executes diagnostic routines to ensure that the equipment is operating correctly. Thereafter, lens 6 is centered with respect to lamp 11. Centering may be accomplished by comparing and balancing the amplitudes of electrical signals produced by opposed pairs of light intensity sensors 14. The comparison and balancing can be carried out either on a separate apparatus or through a balancing routine built into the software stored in PROM 26. In the latter case, the signals from light sensors 14 are supplied over line 34 to interface 33. Those signals are processed by computer 26 and a message is displayed on CRT 35 indicating whether centering has been achieved or should be attempted again. Because the SAE standards are based upon orthogonal horizontal and vertical axes, it is preferred that a pair of light sensors 14 symmetrically disposed along each of these two axes be employed in the centering process.

Once the headlight has been centered, its aim and/or radiation pattern is tested. In a headlight containing dual filaments and used for both low beam and high beam illumination, only low beam aim is normally checked. In this explanation it is assumed that separate low beam and high beam lamps are employed and that low beam and high beam lamps are being tested in that order. The lamp is energized so that an image is formed on screen 12 which is captured by video sensor 13. The video sensor passes through digitizer 21 light intensity values and associated locations for each cell of a predetermined size in a matrix. In the SAE test using a standard 25 foot separation between a headlight and a screen, the illuminated area of interest is 87.1 inches hight by 107.5 inches wide. In a preferred embodiment of the invention employing a matrix of 256 columns and 240 elements overlying the illuminated area of interest, each matrix cell represents an area of about 0.42 inch in width and 0.36 inch in height. Since the image formed on the screen in the novel apparatus is smaller than the SAE pattern at 25 feet, each light intensity cell on screen 12 is actually much smaller than 0.42 inch by 0.36 inch. However for a 256 by 240 matrix, each cell corresponds to a 0.42 inch by 0.36 inch area of the SAE standard pattern. Different matrix cell sizes can produce finer or coarser divisions of the SAE standard lamp illumination pattern.

The SAE low beam aiming standard specifies that two points having a fixed geometrical relationship to each other must also have a particular intensity relationship. One of the points must lie on the horizontal axis 10½ inches to the right from the intersection of orthogonal horizontal and vertical axes and have an intensity equal to 20% of the maximum low beam intensity. The other point must lie on the vertical axis 5 inches below the intersection of the horizontal and vertical axes and have an intensity of 30% of the maximum low beam intensity. Once these points are found, the axes are "drawn" and the location of the intersection of the axes is determined. The location of that intersection is compared to the intersection of horizontal and vertical axes on a vehicle, as specified by the manufacturer, to determine accuracy of headlight aiming.

In a preferred embodiment of the invention, the light intensity value in each cell in the matrix is digitized, if necessary. The digital signals containing light intensity and cell location data are referred to as pixels. Microprocessor 25 sorts through the pixels in this and other tests, the brightest intensity. In sorting through the pixels in this and other tests, it may be desirable to average a pixel with each of its immediately adjacent neighbors to avoid false readings. The averaging can eliminate errors that might be introduced by isolated blemishes that can reduce sensitivities of a few of the light intensity sensors in a CCD camera.

Once the brightest light intensity pixel has been located, its intensity is preferably compared to a minimum acceptable threshold. If the light intensity of the brightest pixel is below the threshold, an error message is produced so that the operator may determine whether the headlight is obstructed or defective and whether to continue the test or to replace the lamp. Assuming the minimum brightest intensity criterion is met, microprocessor 25 next calculates the 20% and 30% intensity levels. Thereafter the program determines whether points having the SAE-specified intensity and geometrical relationships exist.

In a preferred pixel-scanning routine, the software begins searching a pixel column to the right of the location of the brightest light. Once the calculated 20% of highest intensity light value is encountered in that column, the software scans the pixel matrix the equivalent, on the standard SAE size image, of 10½ inches to the left and 5 inches down. That is, for the preferred embodiment employing 256 columns and 240 elements, the matrix search shifts 25 columns to the left and 14 columns down. The pixel thus located is tested to determine whether its brightness is 30% of the maximum. If not, the search returns to one column to the left of the original search location. The comparison process in continually reiterated until the SAE-specified geometrical and light intensity relationships are satisfied. Once these relationships are satisfied, orthogonal horizontal and vertical axes are drawn through the 20% and 30% intensity points and the location of the intersection of these axes is calculated by microprocessor 25 at the direction of the software resident in PROM 26.

The location of the intersection calculated from the measured light intensities is compared to the location of the mechanical intersection specified by the vehicle manufacturer. The location of the mechanical intersection may be supplied to the apparatus by an operator via keyboard 35 or may be stored in the software for reference. Microprocessor 25 can then calculate any variance between the mechanical intersection and the intersection calculated from the measured light intensities to determine if the headlight is aimed within the degree of accuracy prescribed by the SAE. For example, deviations of no more than 3/10 of an inch vertically and horizontally may be permitted. The results of the aiming accuracy calculation may be displayed on CRT 35, may be printed on printer 30, and/or may generate an electrical error signal that is supplied to stepper driver 36 when powered screwdrivers are part of an embodiment of the invention. As noted above, driver 36 translates the error signals into appropriate electrical control signals for dirving the screwdrivers to correct the aim of the headlight.

If the headlight is grossly misaimed or defective, it is possible that the points having the light intensity and geometrical relationships specified in the SAe standards will not be located. If after an established amount of scanning of the pixels, points satisfying the SAE criteria are not located, an error message is output by the apparatus on at least one of printer 30 and CRT 35. In that event, a substantial, coarse re-aiming of the headlight may be made followed by a repetition of the low beam aiming routine. Alternatively, the lamp is replaced.

The SAE standards for aiming high beam lamps are different from the low beam standard, necessitating use of a different aiming program. As noted above, when dual beam lamps are used, only the low beam needs to be aimed. However, since separate high beam lamps are commonly used presently, a separate high beam aiming procedure should be available. In the first step of the high beam method, the lamp is centered with respect to the lens of the aiming device in the manner already described for aiming a low beam lamp. Thereafter, the high beam lamp is energized and the pattern of light produced on screen 12 is captured by video sensor 13. The captured light intensity and location information is converted into a matrix of pixels, if necessary.

Since high beam lights are intended for long distance illumination, the mechanical axis intersection for the vehicle and the intersection of the horizontal and vertical axes of symmetry of the light beam are essentially coincident. In order to determine the location of the intersection of the orthogonal horizontal and vertical axes of the light pattern, a symmetry test is performed using the pixels. Light intensity values on the left and right sides of the pattern are evaluated to locate a vertical axis in which the best valance between the pixels on either side of the axis is obtained. Likewise, the same balancing technique is applied for pixels in the upper and lower half of the light pattern. For example, light intensities of all of the pixles lying on one side of an arbitrary horizontal aixs are compared to the light intensities of all the pixels lying on the other side of the arbitrary horizontal axis. The comparison of the pixels is continued as the position of the arbitrary horizontal axis is shifted until a perfect balance or the most nearly perfect balance obtainable is achieved. The horizontal axis is established at that balance position. The vertical axis is similarly located.

Once the horizontal and vertical axes have been determined by microprocessor 25, employing the balancing routine from the program stored in PROM 26, the location of the intersection of the horizontal and vertical axes is calculated. This location is compared to the mechanical axis specified by the vehicle manufacturer to determined if the difference is within the prescribed degree of accuracy.

As with the low beam aiming method, any deviation between the mechanical and optical axes may be displayed on printer 30 and/or CRT 35. If a sufficient error exists, and electrical error signal may be produced indicating the direction and degree of error. This electrical error signal is passed by bus interface 23 through bus 22 to stepper driver 36 which generates control pulses and actuates screwdriver 17 in order to bring the high beam aim within the prescribed degree of accuracy.

By use of a microprocessor and related memories of sufficient capacity, the aiming methods can be carried out quickly. For example a matrix of 61,000 pixels can be digitized in about 1/60 second. Completion of the aiming calculations can be rapidly completed so that the accuracy of the aim can be determined and, if necessary, adjusted in no more than a minute in an automated apparatus. This rapid response is particularly important in vehicle manufacture and represents a substantial improvement compared to the mechanical/optical, conventional aiming devices.

Since the novel method and apparatus determines light intensity at each pixel in a matrix covering all or nearly all of the illumination pattern produced by the headlight, the invention may also be used to determine whether the pattern meets established illumination pattern standards. For example the SAE specifies illumination pattern standards. For example the SAE specifies illumination beam standards consisting of a maximum, a minimum or a range of light intensity for each of a number of locations in an illumination pattern. Different test points intersection of the orthogonal horizontal and vertical axes is determined for a lamp, it is a simple matter, using the pixel matrix, to test the specified points to determine whether the light pattern meets the SAE standard. As before, applying different standards would be a simple matter in the invention, merely requiring alteration of the program stored in PROM 26.

In addition to testing the light intensity at discrete points within the illumination pattern of a headlight, the pixel matrix provides the ability to produce a graphical plot of the illumination beam. Because of the digitization of the light intensity levels, it is a relatively simple matter to determine the location of contours of uniform light intensity within the radiation pattern. These contours, referred to as isocandela lines, may be displayed in a number of ways in the invention. For example, the lines themselves can be drawn either on CRT 35 and/or with printer 30 to produce a plot resembling a topographical map. In addition, if CRT 35 has color capabilities, a false color can be assigned to each region between adjacent isocandela lines. A multiple color display can readily illustrate the light intensity pattern of a headlight. The same visual effect can be presented in black and white by controlling the intensity of the display between isocandela lines on a CRT or a printer.

Figure 5:
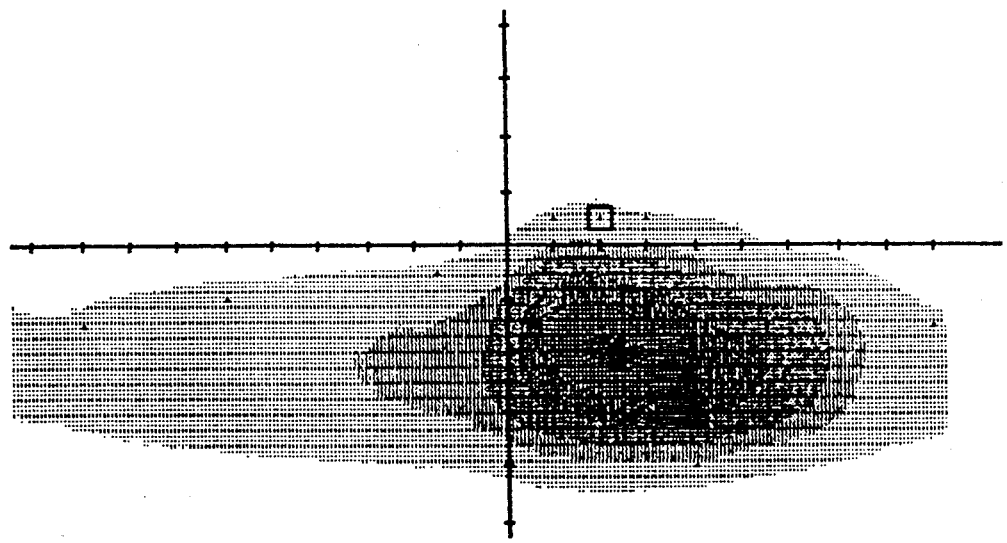
FIG. 5 is a graphical display produced according to the invention of a low beam light pattern of a vehicular headlight.
Figure 6:
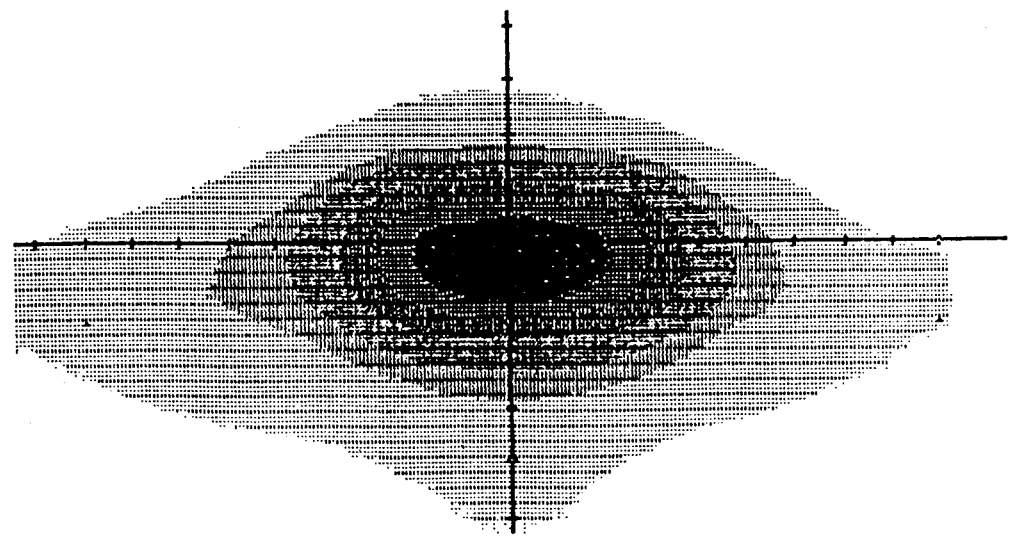
FIG. 6 is a graphical display produced according to the invention of a high beam light pattern of a vehicular headlight.

Examples of black and white graphical displays are shown in FIGS. 5 and 6 for low beam and high beam lamps, respectively. Those figures are further understood when taken in conjunctioon with Tables I and II which represent application of the SAE illumination pattern standard tests to the illumination patterns display in FIGS. 5 and 6, respectively.

TABLE I

| PNT. NO. | LOCATION | | PASSING RANGE (MIN. -MAX.) | MEASURED CANDELA |
|---|---|---|---|---|
| 01 | 10.0U | 0.0R | (0 -125) | Off Screen |
| 02 | 1.0U | 1.5L | (0 -700) | 550 |
| 03 | 0.5U | 1.5L | (0 -1000) | 680 |
| 04 | 0.5D | 1.5L | (0 -2500) | 2230 |
| 05 | 1.5U | 1.0R | (0 -1400) | 550 |
| 06 | 0.5U | 1.0R | (0 -2700) | 2350 |
| 07 | 0.5U | 2.0R | (0 -2700) | 2720 FAIL |
| | 0.25U | 0.00L | 00 | 2230 PASS |
| 08 | 0.5U | 3.0R | (0 -2700) | 2230 |
| 09 | 0.5D | 1.5R | (8000 -20000) | 11340 |
| 10 | 1.0D | 6.0L | (750 -75000) | 2790 |
| 11 | 1.5D | 2.0R | (15000 -75000) | 23000 |
| 12 | 1.5D | 9.0L | (750 -75000) | 2230 |
| 13 | 1.5D | 9.0R | (750 -75000) | 2230 |
| 14 | 4.0D | 4.0R | (0 -12500) | 4030 |
| 15 POINTS TESTED. | | | 1 RETESTED. | 0 FAILED |

TABLE II

| PNT. NO. | LOCATION | | PASSING RANGE (MIN. -MAX.) | MEASURED CANDELA |
|---|---|---|---|---|
| 01 | 2.0U | 0.0R | (750 -75000) | 5200 |
| 02 | 1.0U | 3.0R | (3000 -75000) | 12580 |
| 03 | 1.0U | 3.0L | (3000 -75000) | 12830 |
| 04 | 0.0D | 0.0R | (18000 -60000) | 35150 |
| 05 | 0.0D | 3.0R | (12000 -75000) | 24420 |
| 06 | 0.0D | 3.0L | (12000 -75000) | 23310 |
| 07 | 0.0D | 6.0R | (3000 -75000) | 5450 |
| 08 | 0.0D | 6.0L | (3000 -75000) | 6380 |
| 09 | 0.0D | 9.0R | (2000 -75000) | 2230 |
| 10 | 0.0D | 9.0L | (2000 -75000) | 3280 |
| 11 | 1.5D | 0.0R | (3000 -75000) | 22190 |
| 12 | 1.5D | 9.0R | (1250 -75000) | 2790 |
| 13 | 1.5D | 9.0L | (1250 -75000) | 3780 |
| 14 | 2.5D | 0.0R | (1500 -75000) | 8370 |
| 15 | 4.0D | 0.0R | (0 -5000) | 3340 |
| 16 POINTS TESTED. | | | 0 RETESTED. | 0 FAILED |

Turning to Table I and corresponding FIG. 5, the fourteen specified SAE test points for a low beam headlight are displayed in Table I. Table I contains in its first column the identifying point or location numbers as specified by the SAE. In the second and third columns, the coordinates of the test point in inches referred to the horizontal and vertical axis intersection as measured on an illumination pattern projected on a screen located 25 feet from the headlight are listed. (In the invention where a smaller, closer image corresponding to the 25 foot distant image is formed the SAE coordinates are scaled to the smaller image size in the course of automatically analyzing the pattern.) The suffixes, U,D,R and L refer to up and down, right and left, with respect to the intersection of the horizontal and vertical axes. Each of these measured locations is indicated in FIG. 5 by a dot. In the fourth column the light intensity standard specified for each point is stated in candela units. The last column contains the actual measured light intensity, in candela, derived from the pixel at the specified location. In the illumination pattern measurements absolute light intensity is measure. In the aiming procedures, relative light intensities may be sufficient. In order to measure absolute intensities, the novel instrument is calibrated using a light intensity standard lamp having a known illumination pattern and light intensity. In either case, relative light intensity is sensed, with either a "floating" reference or an absolute reference derived from the calibrated standard lamp.

As is apparent from a comparison of Table I and FIG. 5, the printed areas in FIG. 5 represent a number of illumination levels, but some light is also present outside the printed area, i.e. beyond what may appear to be the limit of illumination pattern in FIG. 5. As indicated in Table I, an initial test at SAE point 7 resulted in an intensity that exceeded the upper limit specified by the SAE. In a preferred embodiment of the invention, additional tests are made near a point where the initial test fails. The SAE standards permit a tolerance of 0.25° in the location of the test point. In response to a test failure, pixels within 174° of the failure point are recovered individually from the matrix and their indicated light intensities are applied against the SAE test. This re-testing is continued until the established SAE criteria is met or until all of the pixels within 0.25 of the specified point have been tested and failed the test.

Table I is an example of a visual display describing illumination pattern that may be prepared by the invention and printed on printer 30. Preferably, an indication of a test failure, such as the one shown in Table I is supplied. There, the test failure is noted and each of the re-tested points is indicated to show that the test has been ultimately passed or failed. Likewise, in FIG. 5, a graphical output that may be produced by printer 30, an indication is made of an initial failure of a test point to meet the SAE standards. In the embodiment shown, a square has been drawn around the initially failed test point.

Turning to Table II and FIG. 6, similar tabular and graphical output is shown for a test of a high beam lamp of different manufacture. The SAE tests specify 15 discrete test points for high beam illumination patterns. Again, although they are diffuicult to locate because of the intensity of the graphical output, the tested points are shown on the grid of FIG. 6 as dots. Since no points failed the initial test of Table II, no points were re-tested in this application the the invention.

The flexibility and advantages of the invention are apparent from the foregoing description. By measuring light intensity at each cell in a large, continuous matrix of cells covering an illumination pattern, nearly any desired information concerning headlight aiming, illumination beam pattern or other headlight illumination characterisic can be determined. Once a desired characteristic to be determined has been chosen, apparatus according to the invention can be adapted to produce the needed information merely by supplying the appropriate program instructions through PROM 26. Any governmental and/or industrial tests and standards can be incorporated in the method of the invention simply by revising the software resident in PROM 26.

The invention has been described with respect to certain embodiments. Modifications and additions within the spirit of the invention will occur to those of skill in the art. Accordingly, the scope of the invention is limited solely by the following claims.

We claim:

1. A method of aiming a vehicle headlight comprising:

focusing a light beam from a vehicle headlight with a lens onto a surface;

centering the headlight and lens relative to one another with light intensity sensors;

sensing the intensity of the focused light beam in each cell in a matrix of cells overlying the focused light beam and generating for each of said cells a pixel, i.e., an electrical signal indicative of the position of the cell and the intensity of a light beam in the cell; and comparing a sufficient number of pixels to determine the location of the brightest pixel in the beam, determining light intensity at the brightest pixel, calculating at least two established light intensity levels relative to the intensity at the brightest pixel, and scanning pixels to determine the location of two pixels each having one of the calculated intensity levels and having an established geometrical relationship to each other.

2. The method of claim 1 including determining the location of the intersection of orthogonal axes passing through said two located pixels and wherein said comparing step comprises comparing the location of the intersection of said axes with an established intersection to determine if the headlight is aimed within a prescribed degree of accuracy.

3. The method of describing the illumination pattern of a vehicle headlight comprising:

focusing with a lens a lightbeam from a vehicle headlight onto a surface;

sensing with a charge couple device camera the intensity of the focused light beam in each cell in a matrix of cells overlying the focused light beam and generating for each of said cells a pixel, i.e., an electrical signal indicative of the position of the cell and the intensity of the light beam in the cell;

comparing at least some of the pixels to each other to determine whether that light is aimed within a prescribed degree of accuracy;

visually displaying at least some of said pixels to describe the light intensity pattern of the headlight;

comparing light intensities of selected pixels to established light intensities criteria for the locations of said selected pixels to determine whether the illumination pattern of the headlights satisfies said establish criteria; and when a pixel fails to meet the established criteria, comparing at least one additional proximate said failed pixel to determine whether the illumination pattern of the headlight meets said established criteria.

* * * * *

UNITED STATES PATENT AND TRADEMARK OFFICE
CERTIFICATE OF CORRECTION

PATENT NO. : 4,948,249

DATED : August 14, 1990

INVENTOR(S) : Hopkins et al

It is certified that error appears in the above-identified patent and that said Letters Patent is hereby corrected as shown below:

Column 14, line 31, insert the word --pixel-- after the word "additional".

Signed and Sealed this

Twenty-eighth Day of January, 1992

Attest:

HARRY F. MANBECK, JR.

Attesting Officer

Commissioner of Patents and Trademarks